United States Patent
Linstrom et al.

(10) Patent No.: US 6,934,630 B2
(45) Date of Patent: Aug. 23, 2005

(54) GPS RECEIVER TRACKING SYSTEM

(75) Inventors: Lloyd A. Linstrom, Columbia, MD (US); Dennis J. Duven, Silver Spring, MD (US)

(73) Assignee: The John Hopkins University, Baltimore, MD (US)

(*) Notice: Subject to any disclaimer, the term of this patent is extended or adjusted under 35 U.S.C. 154(b) by 0 days.

(21) Appl. No.: 10/415,541

(22) PCT Filed: Dec. 12, 2001

(86) PCT No.: PCT/US01/47908

§ 371 (c)(1),
(2), (4) Date: Apr. 30, 2003

(87) PCT Pub. No.: WO02/50561

PCT Pub. Date: Jun. 27, 2002

(65) Prior Publication Data

US 2004/0010369 A1 Jan. 15, 2004

Related U.S. Application Data

(60) Provisional application No. 60/256,870, filed on Dec. 20, 2000.

(51) Int. Cl.[7] ............................................. G01C 21/26
(52) U.S. Cl. .................. 701/213; 701/205; 342/357.06; 342/357.07
(58) Field of Search ................................ 701/205, 207, 701/213–215, 300; 342/357.02, 357.06, 357.07, 357.08, 357.15; 340/426.19

(56) References Cited

U.S. PATENT DOCUMENTS

| | | | |
|---|---|---|---|
| 4,578,678 A | 3/1986 | Hurd | 343/418 |
| 4,959,656 A | 9/1990 | Kumar | 342/418 |
| 5,379,224 A | 1/1995 | Brown et al. | |
| 5,594,454 A | 1/1997 | Devereux et al. | 342/352 |
| 5,875,412 A * | 2/1999 | Sulich et al. | 701/207 |
| 5,956,250 A * | 9/1999 | Gudat et al. | 701/26 |
| 6,040,194 A | 3/2000 | Chick et al. | 128/634 |
| 6,133,873 A | 10/2000 | Krasner | 342/357.12 |
| 6,214,563 B1 | 4/2001 | Negulescu et al. | 435/5 |
| 6,297,059 B1 | 10/2001 | Song et al. | 436/518 |
| 6,402,986 B1 | 6/2002 | Jones, II et al. | 428/690 |
| 6,410,255 B1 | 6/2002 | Pollok et al. | 435/21 |
| 6,438,489 B1 * | 8/2002 | Greif | 701/209 |

OTHER PUBLICATIONS

"Postflight Trajectory Reconstruction of a 70 mm Rocket Using a Miniaturized GPS Translator" GPS User's Conference, Oct. 2000, by William DAmico, et al.

William P. D'Amico, Mark S. Asher, et al., Postflight Trajectory Reconstruction of a 70mm Rocket Using a Miniaturized GPS Translator, GPS User's Conference, Oct. 2000.

* cited by examiner

Primary Examiner—Gertrude A. Jeanglaude
(74) Attorney, Agent, or Firm—Francis A. Cooch

(57) ABSTRACT

A receiving station tracking system for receiving GPS data and tracking a mobile vehicle. The receiving station tracking system includes at least one processing stage receiving and processing at least a portion of the GPS data, and a control module receiving and filtering the processed GPS data and outputting at least one control signal in accordance with filtering results. The at least one control signal controls decreasing or increasing a quantity of processing stages of the at least one processing stage.

23 Claims, 6 Drawing Sheets

GPS RECEIVER TRACKING SYSTEM

CROSS-REFERENCE TO RELATED APPLICATIONS

This application claims the benefit of U.S. provisional application No. 60/256,870, filed on Dec. 20, 2000, which is hereby incorporated by reference in its entirety.

STATEMENT OF GOVERNMENTAL INTEREST

The Government has rights in this invention pursuant to Contract No. NAS5-97179 awarded by the National Aeronautics and Space Administration.

BACKGROUND OF THE INVENTION

1. Field of the Invention

The present invention relates to the field of Global Positioning System (GPS) receivers receiving transmission GPS signals from satellites and processing the GPS signals for obtaining information, and storing the information. The present invention particularly relates to a GPS receiver tracking system tracking a high dynamic vehicle in accordance with GPS data received from a translator placed on the high dynamic vehicle. The system is preferably implemented entirely using software.

2. Description of the Related Art

The Global Positioning System (GPS) is a satellite-based navigation system that continuously transmits timing, frequency and satellite position information to potential users. The GPS consists of a full constellation of four satellites in half geo-synchronous orbits. The GPS satellites continuously emit coded GPS signals The GPS signals can be received from at least four GPS satellites at any point on or near the Earth.

A GPS signal contains timing information that allows a user to determine the time elapsed for the GPS signal to transverse the distance between the GPS satellite and a receiver receiving the signal. By knowing the time the GPS signal left the GPS satellite, the time the GPS signal arrived at the user, and the speed of the GPS signal, the receiver can determine the distance from itself to the GPS satellite. The measured range is referred to as "pseudorange" because there is generally a time difference or offset between timing clocks on the satellites and the GPS receiver clock. Thus, for three dimensional position determinations, at least four satellite signals are needed to solve for four unknowns, i.e., the time offset and the three dimensional positions of the satellites. By knowing the orbital position of four GPS satellites (ephemeris data), and the distance from itself to each of four GPS satellites, the receiver can successfully triangulate its own position. Receiver position calculations performed using greater than four satellites generally have an improved accuracy.

The GPS signal emitted by the satellites contains an L-band carrier component (L1) transmitted at a frequency of 1575.42 MHz. The L1 carrier component is modulated by a coarse acquisition (C/A) pseudorandom (PRN) code component unique to the satellite and a data component. The PRN code provides timing information for determining when the GPS signal was broadcast and identifying which satellite emitted the signal. The data component provides information defining the satellite ephemeris, satellite clock corrections and other GPS information. The carrier component allows a receiver to more easily acquire the GPS signal.

It is known in the art to use the Global Positioning System (GPS) for testing and evaluating purposes, such as for testing and evaluating the performance of moving vehicles. However, accurate development of test data for high dynamic vehicles has proved problematic, as well as for test data obtained from multipath GPS signals and GPS signals reflected from the ocean.

GPS receivers have been developed for testing of high dynamic vehicles. However, the receivers are limited for use with very high dynamic vehicles, such as missiles having a short time of flight and small dimensions. GPS receivers are generally too large to be fitted on a small missile, and the time needed for obtaining a first set of data may exceed the entire flight time.

Typically, use of GPS receivers for platforms such as small missiles has been replaced by the use of translators. A translator is a device capable of downlinking the complete GPS spectrum to ground recording equipment for post flight tracking and trajectory reconstruction. The translators have applications for high dynamic guidance, range safety and post-test trajectory analysis. However, translators currently available tend to be costly and highly proprietary, limiting the possibility of modifying the translator for special applications. Another drawback to available translators is the need for accessing a large bandwidth that is not always available at test ranges.

In one suggested solution, recorded data obtained from the translator and recorded data obtained by a ground receiver approximately simultaneously with the data obtained by the translator are processed by filtering and smoothing algorithms to produce a smooth trajectory. However, during the boost phase of the flight, the signal-to-noise ratio (SNR) is very low.

Accordingly, there exists a need for a method and a system for processing recorded GPS data obtained form a translator mounted on a mobile dynamic vehicle and recorded data obtained approximately simultaneously with the data obtained by the translator by a ground receiver, in which the tracking results are accurate for all phases of movement of the vehicle, where the vehicle is a high dynamic vehicle.

SUMMARY OF THE INVENTION

It is an object of the present invention to provide a method and a system for processing recorded GPS data obtained from a translator and recorded data obtained approximately simultaneously with the data obtained by the translator by a ground receiver, in which the tracking results are accurate for all phases of the flight of a very high dynamic vehicle or for GPS signals reflected off the water.

It is a further object of the present invention to minimize processing time while maintaining accuracy when processing recorded data obtained from a translator and recorded data obtained approximately simultaneously with the data obtained by the translator by a ground receiver.

Yet a further object of the present invention to provide a GPS receiver which performs tracking and recovery of timing information using software instead of a combination of hardware and software.

In keeping with these and other objects of the present invention, a receiving station tracking system for receiving GPS data and tracking a mobile vehicle is provided. The receiving station tracking system includes at least one processing stage receiving and processing at least a portion of the GPS data, and a control module receiving and filtering the processed GPS data and outputting at least one control signal in accordance with filtering results. The at least one control signal controls decreasing or increasing a quantity of processing stages of the at least one processing stage.

DETAILED DESCRIPTION OF THE PREFERRED EMBODIMENT

Figure 1:
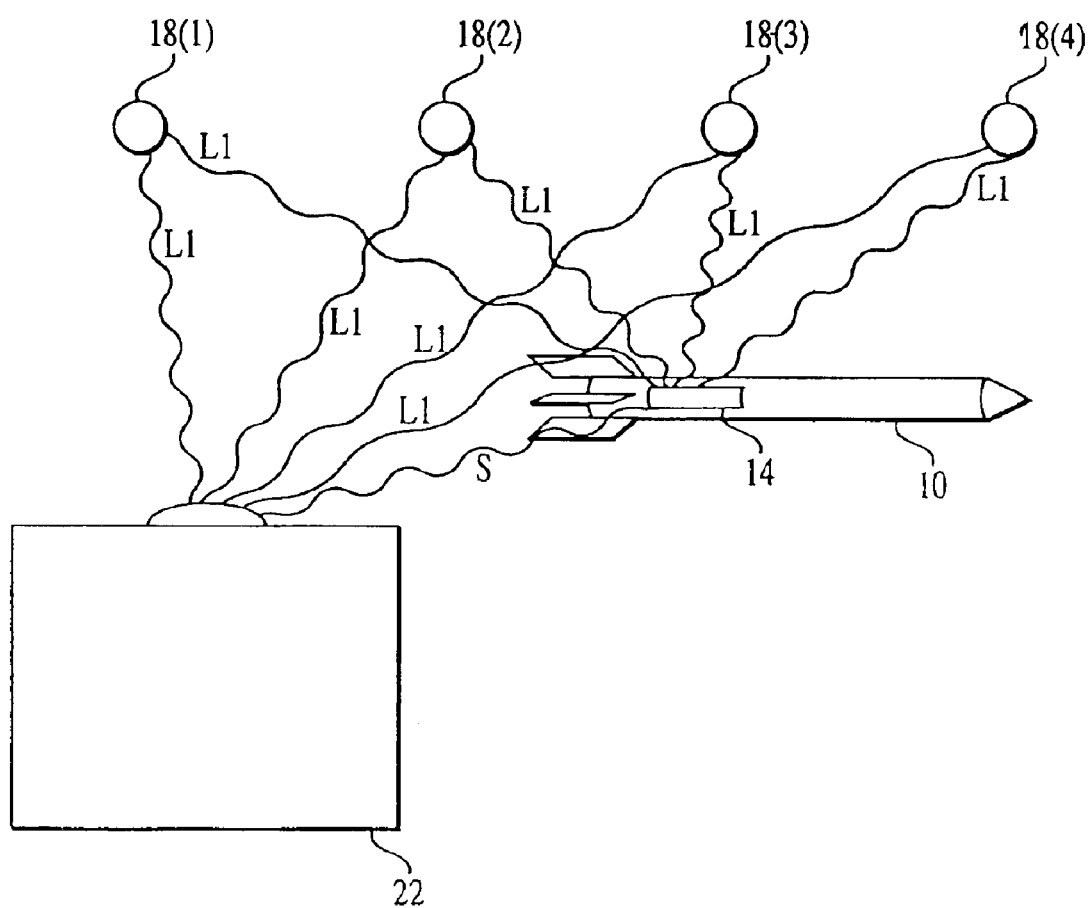
FIG. 1 is a schematic diagram of a prior art receiving station tracking a missile.

In FIG. 1, a missile 10 equipped with a conventional translator 14 is shown in flight while being tracked using GPS. As is known in the art, during the flight of the missile 10, the translator 14 receives a GPS signal including an L1 carrier from at least four satellite vehicles (SVs) 18n, where n=1–24, of 24 available SVs 18n. The translator converts each received signal to an S band signal (approximately 2265.5 MHz), and transmits the S-band signal to a nearby ground receiving station 22. The receiving station 22 receives the S band signal, converts it back to a GPS signal and processes the GPS signal and records the processed GPS signal as translator GPS data.

During the flight of the missile 10, the receiving station 22 receives a GPS signal including an L1 carrier from at least four SVs 18(n) (the same set of SVs 18(n) due to the proximity of the missile 10 during flight and the receiving station 22). The receiving station 22 and the translator 14 receive the GPS signals simultaneously or approximately simultaneously. The receiving station 22 processes and records the GPS signal as receiver station GPS data. The receiving station 22 performs processing on the recorded translator GPS data and the receiving station GPS data.

During the processing, described in further detail below, a series of Fast Fourier Transforms (FFTs) are repeatedly performed on a set of sampled translator GPS data for correlating the translator GPS data. After each repetition the results of the FFT processing and the degree of correlation are analyzed and used to reduce processing elements by reducing the set of sampled translator GPS data for the next repetition. Reduction of the number of processing elements allows the algorithm to run faster.

The object being tracked may be any vehicle located proximate the receiving station 22 and equipped with the translator 14. In the example provided in FIG. 1, the object being tracked is a missile 10, such as a Stinger, Hydra rocket or Tomahawk, having high dynamic flight qualities in which there is a high variation of velocity and acceleration values. During the boost stage of flight, the acceleration of the missile begins at nil, rapidly climbs to a high peak value, and continues to rapidly change. During the coast stage of flight the acceleration of the missile changes gradually. During the landing stage of flight the acceleration drops to nil.

Translators are known in the art. The translator 14 preferably multiplexes inputs from up to four dual frequency antennas, downconverts them to an intermediate frequency (IF) where they are filtered and combined with a pilot carrier. The signal is then upconverted to S-band and transmitted.

Figure 2:
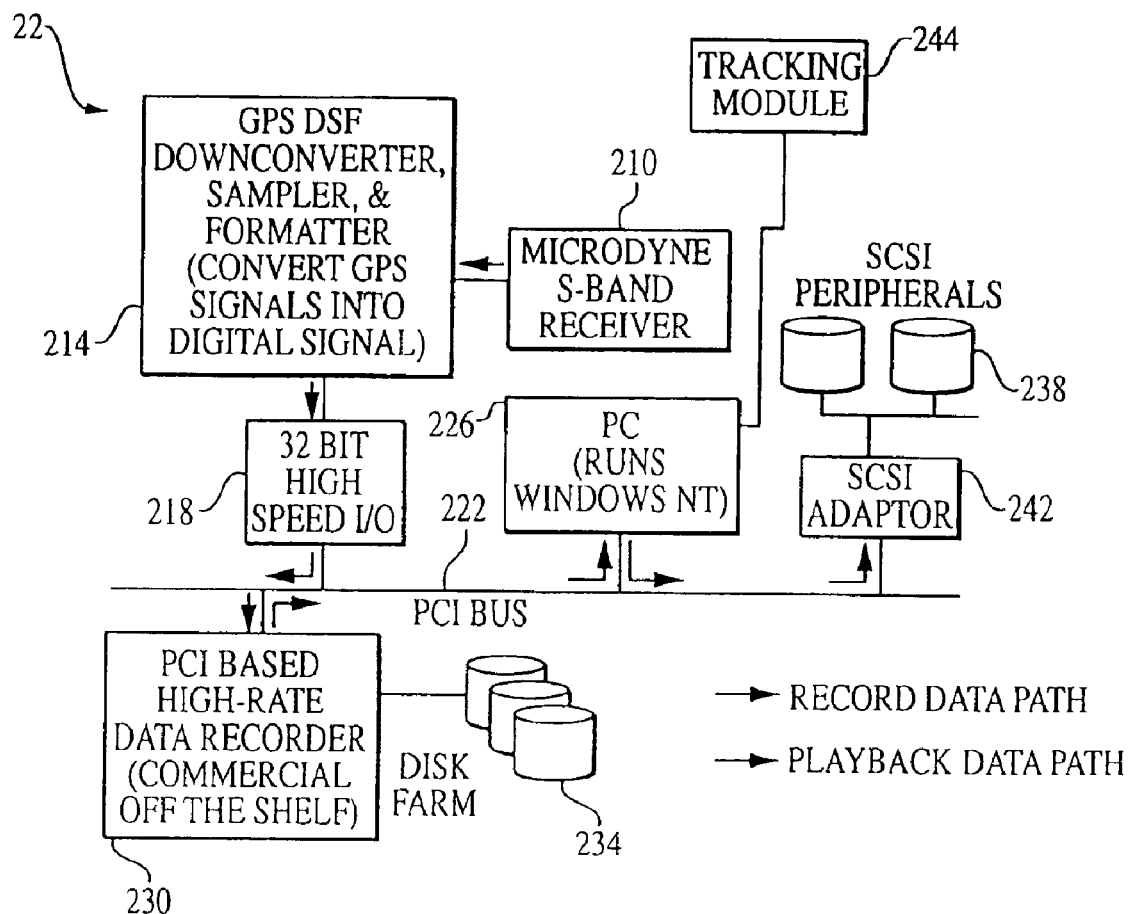
FIG. 2 is a block diagram of an exemplary receiving station in accordance with the present invention.

FIG. 2 shows a block diagram of an exemplary receiving station 22. The receiving station 22 includes at least one antenna assembly (not shown) for receiving signals transmitted by SVs 18(n) and the S-band signal transmitted by the translator, and a conventional S-band receiver 210, which receives the S-band signal transmitted by the translator and converts it into a GPS signal. The receiving station 22 further includes a GPS downconverter, sampler and formatter (DSF) 214 that receives the GPS signal converted from the received translator S-band signal and the GPS signal received from the SVs 18(n). Preferably, the GPS DSF 214 samples the receiving station GPS data and the translator GPS data at the same rate.

The GPS DSF 214 downconverts the received receiving station and translator GPS signals each into a pair of in-phase (I) and quadrature (Q) signals, samples the signals at approximately 23.333 MHz, formats them into 32-bit words, and passes them through a 32-bit high speed I/O 218 to a PCI bus 222 as time ordered signal pairs $I(t_i)$, $Q(t_i)$, where $t_i=i(\Delta t)$, and $\Delta t=$a time interval per input data sample. A computer 226, i.e. a computer capable of running a network operating system, such as Windows NT™, controls the PCI bus 222 activity and routes the sampled data to a commercially available high-rate data recording system 230 having a software interface. The recording system 230 places the sampled data on a hard drive farm 234 in a proprietary format. The computer 226 may access the sampled data using the software interface of the recording system 230, format the sampled data into standard network operating system files, and store them on an array of removable SCSI peripheral hard drives 238 accessible to the computer 226 via a SCSI adapter 242.

The receiving station 22 further includes a tracking module 244 for processing the sampled data associated with the receiving station GPS data and the translator GPS data. The tracking module 244 accesses the sampled data stored on the hard drives 238. The tracking module 244 may access the sampled data via the computer 226 as shown, or the tracking module may include necessary software and hardware for accessing the hard drives 238. The tracking module 244 may further be included within the computer 226 or a different computer. It is to be understood that the receiving station 22 of FIG. 2 is exemplary, and that the receiving station GPS data and the translator GPS data may be processed and stored by other means so that the data is stored as time ordered sampled digital data and is accessible by the tracking module 244.

Figure 3:
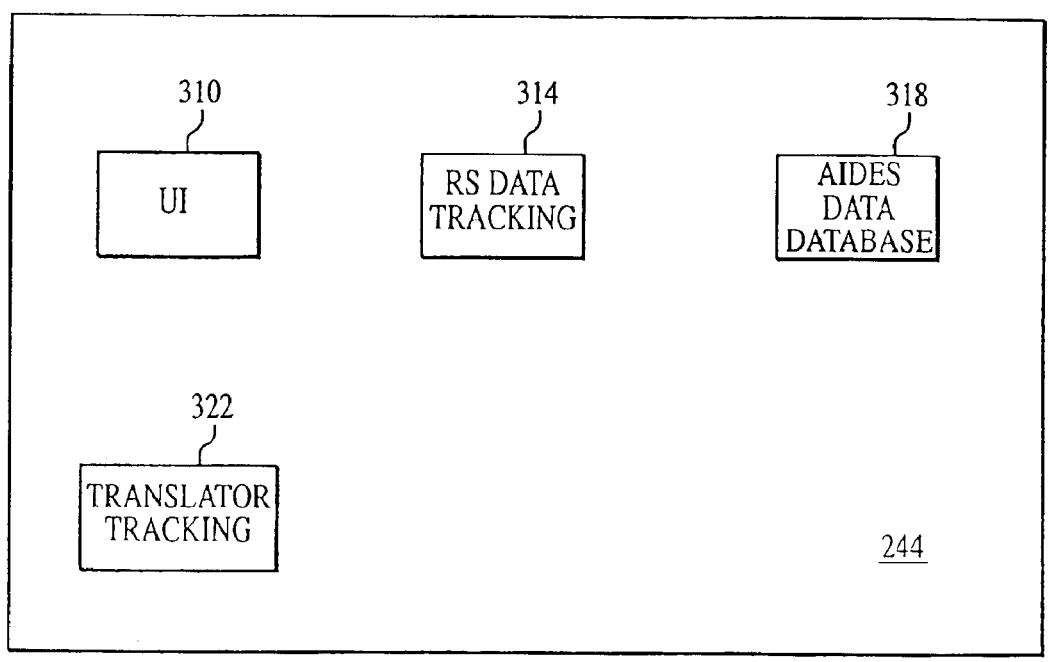
FIG. 3 is a block diagram of a tracking module of the receiving station in accordance with the present invention.

FIG. 3 shows the tracking module 244. The modules of the tracking module 244 may be implemented by software, hardware or a combination thereof. The tracking module 244 includes a user interface UI 310, a receiving station data tracking module 314, aides data database 318, and a translator data tracking module 322. The UI 310 includes means for exchanging data with a user, such as via a keyboard, joystick, microphone, touch screen, etc., where the user can input information, and a GUI, speaker, etc., where the tracking module 244 can output information to the user.

The receiving station data tracking module 314 uses tracking and/or Doppler aides, performs a sky search without using aides, uses other known methods and algorithms for processing the receiving station GPS time ordered sampled data or a combination thereof, in order to extract data from the receiving station GPS data, such as the navigation message and pseudorange. The tracking and Doppler aides are initial estimates specifying which satellite is in view, satellite orbit data and what carrier Doppler frequency is expected. The tracking and Doppler aides may be provided by user input, remote source input, or accessed from the aides data database 318. The aides data database 318 stores known information about the GPS signals transmitted by the SVs 18(*n*). Once data, such as the navigation message and pseudorange values data, is extracted from the receiving station GPS sampled data, selected data such as navigation message bits, the absolute sample index for each C/A code epoch, and time of week (TOW) are captured into a capture file to be provided as tracking aides for processing the high dynamic signal from the translator.

The translator data tracking module 322 processes the translator GPS data by accessing the capture file provided by the receiving station data tracking module 314 for obtaining pseudorange and Doppler data associated with the missile being tracked.

Figure 4:
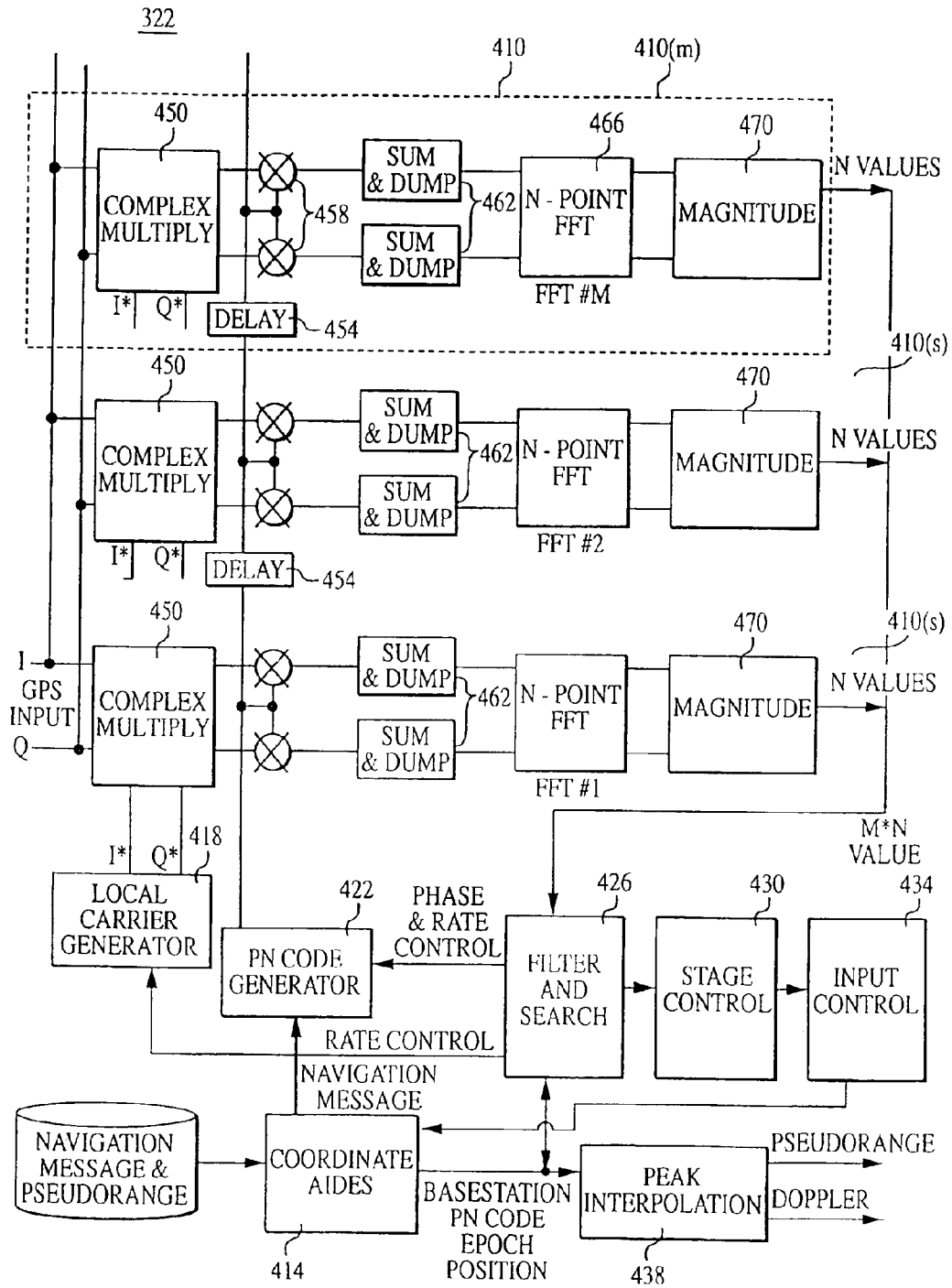
FIG. 4 is a block diagram of a translator tracking module of the tracking module in accordance with the present invention.

FIG. 4 shows the modules and data flow of the translator tracking module 322. The modules of the translator tracking module 322 may be implemented in software, hardware, or a combination thereof. The translator tracking module 322 includes a series of processing stages 410, a coordinate aides module 414, a local carrier generator 418, a PN Code Generator module 422, a filter and search module 426, a stage control module 430, an input control module 434, and a peak interpolation module 438. Each processing stage 410 includes a complex multiply module 450, a delay module 454, a pair of multiplier modules 458, a pair of sum and dump modules 462, an N-Point FFT module 466, and a magnitude module 470. A signal pair I, Q, where I,Q are periodic signals such as sinusoidal waves, for each value of a sample time $t_i$, and the capture file are provided as inputs to the translator tracking module 314. The translator tracking module 314 outputs a pseudorange and Doppler value for each signal pair I, Q.

M processing stages 410(*s*), where s=1 to m are shown in FIG. 4 where a pair of translator GPS data input sample signals I,Q for a given time, $t_i$ are processed relative to a PN code generated by the PN Code Generator 422 and a local carrier signal including periodic complex sinusoidal waves (I*(ti), Q*(ti)), for the time $t_i$, provided by the local carrier generator 418. The PN code is delayed by a different delay at each stage as it passes through delay modules 454. Each delay module 454 generates a delay d, where d is typically half a chip. In the example shown, at processing stage 410(1) the PN code is delayed by d=0. At the processing stage 410(*m*) the PN code is delayed by d=m−1. As described in further detail with reference to FIG. 5, each processing stage 410(*s*) includes the N-point FFT module 466 for performing Fast Fourier Transforms on the signals being processed and outputs N magnitude values, where N is the number of data points per FFT conversion performed by the N-point FFT module 466.

The capture file is used for control of the PN Code generator module 422. The capture file, or a portion thereof is accessed by the coordinate aides module 414. The coordinate aides module 414 receives a signal from the input control module 434 indicating which sample of the series of input GPS samples is currently being input, and coordinates the data in the capture file with the input translator GPS sampled data. The coordinate aides module 414 further recovers a C/A Code epoch index from data in the capture file for setting the code position (timing) for processing by a reference processing stage 410(*s*), such as the first processing stage 410(1). The coordinate aides module 414 provides navigation message data, including polarity of the PN Code, to the PN Code generator module 422, and further provides a receiving station PN Code Epoch position, which is timing information encoded in data of the capture file, to the Peak Algorithm module 438 and to the filter and search module 426.

The local carrier generator 418 provides the local carrier signal (I*(ti), Q*(ti)) to the pair of multiplier modules 458, which downconverts the translator GPS signal to near baseband. The local carrier generator 418 includes is an oscillator, such as a number controlled oscillator (NCO). The NCO includes a phase accumulator to which a delta, which sets the oscillator frequency, is added for each input sample processed. The output of the phase accumulator is used to generate a complex sinusoid used as the local carrier signal. The rate of the NCO of the local carrier generator 418 is optionally controlled by a rate control signal provided by the filter and search module 426, or the rate of the local carrier may be fixed. Due to a Doppler effect when Fast Fourier Transform processing is performed within the processing stages 410, control of the rate of the local carrier generator 418 is typically not needed, but may be adjusted by the local carrier generator 418 when the filter and search module 426 determines that correlation of input translator data and receiving station GPS data is extremely poor.

The PN Code generator 422 generates a PN code having a pattern of bits, where the bits form a random number. The PN code generator 422 may include an oscillator such as a number-controlled oscillator (NCO). A predetermined PN code is associated with each satellite. The navigation message output by the coordinate aides module 414 controls the polarity of the PN Code Generator 422, effectively wiping off the navigation message from the receiver GPS signal, allowing the sum and dump module pair 462 to accumulate across message bit boundaries without degradation of performance. A phase and rate control signal generated by the filter and search module 426 controls the phase and rate of the NCO of the PN code generator 422. The phase and rate control signal provided by the filter and search module 426 controls the PN code by shifting the PN code and the rate of the code by controlling the rate at which the bits forming the PN code are transmitted via the NCO.

The filter and search module 426 uses the C/A code to control setting the C/A code position (timing) for the reference processing stage, i.e., first processing stage 410(1). The filter and search module 426 further filters the N magnitude outputs of the M processing stages 410(*s*), so that the filter and search module 426 filters a matrix of N*M values. The filter and search module 426 then searches the filtered values for a peak, processes the location of the peak and a Peak-to-Noise ratio, and determines if the results of the processing are satisfactory, i.e., if the correlation between the receiving station GPS data and the current translator GPS data input sample has been achieved.

If the filter and search module 426 determines that correlation has not yet been achieved, the filter and search module 426 then generates control signals based on the location of the peak found during the search with reference to the aides in the capture file of the receiving station, the Peak-to-Noise ratio, and the PN code epoch position signal received from the coordinate aides module 414. The control signals generated by the filter and search module 426 include at least one of the rate control signal to the local carrier generator module 418, the phase and rate control signal to the PN code generator module 422, a control signal to the stage controller module 430, and a control signal to the input control module 434. Upon determination of satisfactory processing results, the output of the processing stages 410 is provided to the peak interpolation module 438.

The filter and search module 426 effectively controls the size of the M*N matrix of values that it processes based on the results its search for a peak. The matrix may be enlarged by instructing the stage control module 430 to add selected processing stages 410(s), or the matrix may be reduced for reducing processing steps. The processing stages 410(s) to be added or removed from the series of processing stages 410 are selected in order to position the expected peak towards the center of the matrix. Furthermore, the expected peak is seeked out by adjusting the phase and rate of the PN Code Generator 422, and the rate of the local carrier generator 418.

The stage controller module 430 receives the control signal from the filter and search module 426 with instructions to add or remove processing stages 410(s). The instructions may include which processing stages 410(s) to add or remove. For example, the instructions may instruct the stage controller module 430 to add or remove only the processing stages 410(s) where "s" is a selected number of lowest possible values, highest possible values, evenly distributed among low and high values, or unevenly distributed values of "s". Thus, the filter and search module 426 controls the number and distribution of processing stages 410(s) used during processing of each translator GPS data input sample. As processing of the translator GPS input data proceeds, the quality of peak detection typically improves, and the filter and search module 426 preferably instructs the stage controller module 430 to reduce the value of "m", thus reducing the amount of processing, and therefore the processing time.

The input control module 434 receives the control signal from the filter and search module 426, accesses the translator station GPS input data samples and sequences to the next translator GPS data input sample I,Q for time $t+\Delta t$, where $\Delta t$ is the time interval per input data sample, in accordance with the control signal. The local carrier generator 418 and the PN code generator 422 also advance to the next output sample based on the programmed rate. Thus, the filter and search module 426 controls when to proceed to the next translator GPS data input samples. Furthermore, as described above, the input control module 434 provides the coordinate aides module 414 with a signal indicating which sample of the series of input translator GPS data samples is currently being input to the processing stages 410(s).

The peak interpolation module 438 is used to determine the peak value and Doppler value more precisely. The peak interpolation module 438 processes the receiving station PN Code Epoch position and the time of week aides together with the data output by the processing stages 410 and filtered by the filter and search module 426, and outputs the pseudorange and Doppler values for the current translator GPS data input sample being processed.

Figure 5:
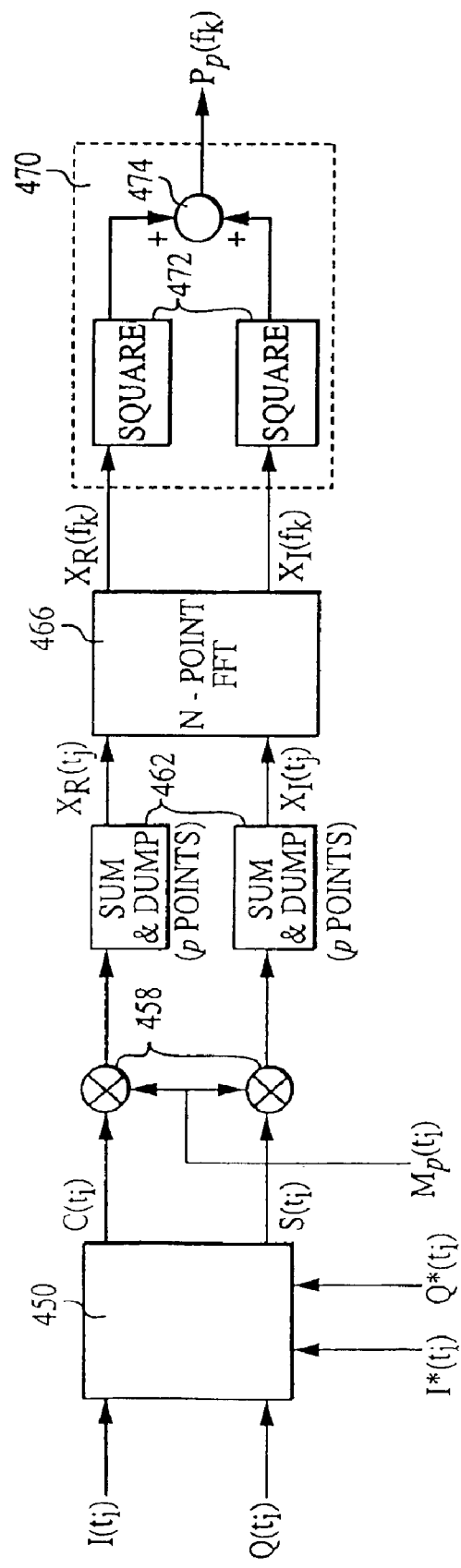
FIG. 5 is a block diagram of an exemplary processing stage of the translator tracking module in accordance with the present invention.

FIG. 5 shows an exemplary processing stage 410(p) in detail, where p is the value of s for a prompt sample, as is known in the art. Table 5, below, defines the terms shown in FIG. 5.

TABLE 5

FFT Acquisition of GPS Signals for Processing Stage 410(p)

| | | |
|---|---|---|
| $I(t_i)$ | = | Received and downconverted in phase data samples |
| $Q(t_i)$ | = | Received and downconverted quadrature data samples |
| $t_i$ | = | $I(\Delta t_1)$ |
| $\Delta t_1$ | = | Time interval per input data sample |
| $I^*(t_i)$ | = | In phase output of the number - controlled oscillator (NCO) of the local carrier generator 418 |
| $Q^*(t_i)$ | = | Quadrature output of the NCO of the local carrier generator 418 |
| $C(t_i)$ | = | Cosine output of the phase detector (complex multiply module 450) |
| | = | $I(t_i) I^*(t_i) + Q(t_i)Q^*(t_i)$ |
| $S(t_i)$ | = | Sine output of the phase detector (complex multiply module 450) |
| | = | $I(t_i) Q^*(t_i) - Q(t_i)I^*(t_i)$ |
| $M_p(t_i)$ | = | Prompt (i.e., on time) output of the local code generator for delay = p − 1 |
| $x_p(t_j)$ | = | Complex FFT input samples, prompt code alignment = $$\sum_{t=0}^{p-1} M_p(t_{pj+i})[C(t_{pj+i}) + jS(t_{pj+i})]$$ |
| $t_j$ | = | $j(\Delta t_2)$ |
| $\Delta t_2$ | = | Time interval between FFT input samples = $p(\Delta t_1)$ |
| $f^s$ | = | Sample rate of the FFT input samples = $\dfrac{1}{\Delta t_2}$ |
| $::f^N$ | = | Nyquist frequency = $\dfrac{1}{2}f_s$ |
| $(-f_N, f_N)$ | = | Span of frequencies that can be unambiguously identified by the FFT algorithm |
| N | = | Number of data points per FFT conversion |
| T | = | Time span of data points going into each FFT conversion = $N(\Delta t_2)$ |
| $X_p(f_k)$ | = | Discrete Fourier transform of the prompt input samples |

TABLE 5-continued

FFT Acquisition of GPS Signals for Processing Stage 410(p)

| | | |
|---|---|---|
| $P_p(f_k)$ | = | Power of the prompt input signal in the kth frequency bin |
| | = | $\{Real[X_p(f_k)]\}^2 + \{Imag[X_p(f_k)]\}^2$ |
| $f_k$ | = | $k(\Delta f)$ |
| $\Delta f$ | = | Width of the FFT frequency bins = $\frac{1}{T}$ |

The complex multiply module 450, the multiplier module pair 458, the sum and dump module pair 462, and the square module 470 of the exemplary processing stage 410(p) operate as is known in the art for wiping off the navigation message from the translator GPS data input sample. Translator GPS data input samples, $I(t_i)$, $Q(t_i)$ signal pair and local carrier $I^*(t_i)$, $Q^*(t_i)$ signal pair from the local carrier generator 418, respectively, for time $t=t_i$, are received by the complex multiply module 450, (also known as a phase detector) of the processing stage 410(p). The complex multiply module 450 multiplies the $I(t_i)$, $Q(t_i)$ and the $I^*(t_i)$, $Q^*(t_i)$ signal pairs and outputs C(ti) and S(ti) as is known in the art. The complex multiply module 450 performs a last stage of downconversion to ordered sequence (I(ti), Q(ti)) using the ordered sequence $I^*(t_i)$, $Q^*(t_i)$ received from the local carrier generator 418.

The C(ti) and S(ti) signals are each multiplied via a respective multiplier module of multiplier module pair 458 by the signal $M_p(ti)$, as is known in the art. The signal $M_p(ti)$ is the PN code output by the PN code generator 422 and delayed by an appropriate delay d generated by delay modules 454, where the delay d=p−1. A first and second sum and dump (also known as accumulate and dump) module of sum and dump module pair 462 respectively receive the output of one of each of the multiplier modules of the multiplier module pair 458. The respective sum and dump module pair 458 sums the output of the multiplier pair 458 for P points, where P is a predetermined number, and outputs the result $x_R(t_j)$, and $x_I(t_j)$, respectively, as is known in the art. Timing of the sum and dump module pair 462 may be independent of the timing of the bits in message bits recovered by the coordinate aides module 414. Each input sample (I(ti), Q(ti)) is processed by the complex multiply block 450, the multiplier module pair 458 and the sum and dump module pair 462. Once an input sample is processed, the next input sample is sequenced to, and is processed. When the sum and dump module pair 462 accumulates a predetermined number (P) of samples, the output of the sum and dump module pair 462 is transferred to N-Point FFT module 466.

The local carrier generator 418 together with the complex multiply module 450, multiplier module pair 458 and the sum and dump module pair 462 effectively perform matched filter processing of the input translator GPS data, as is known in the art.

The N-Point FFT module 466 receives $x_R(t_j)$ and $x_I(t_j)$, and upon accumulating N samples from the sum and dump module pair 462 the N-Point FFT module 466 performs a discrete Fourier transform of the prompt input samples over N points. The N-Point FFT module outputs N complex numbers $X_p(f_k)=X_R(f_k)+i^*X_I(f_k)$ to respective first and second square modules 472 of the magnitude module 470. The first and second square modules 472 respectively output $\{Real[X_p(f_k)]\}^2$ and $\{Imag[X_p(f_k)]\}^2$. The outputs of the first and second square modules 472 are summed by sum module 474 and output as $P_p(f_k)$, having N values, including one value for each frequency bin of the FFT, effectively performing a power spectrum analysis.

An example is now discussed of the operation of the translator tracking module 322. m processing stages 410(s) are enabled for processing. The number m and the selection of stages are selected either by an algorithm or entered by an operator. Selection of m is typically based on known criteria, such as the location of the receiving station 22 and the range of the missile 10 or other trajectile. Preferably, m is initially set to allow for a delay corresponding to twice the maximum distance between the receiving station 22 and the missile 10.

The coordinate aides module 414 receives as aides the stored navigation message and pseudorange derived from the receiving station GPS data in accordance with tracking aides, Doppler aides or sky search, and coordinates the received aides with the input translator GPS data and outputs a navigation message to the PN Code Generator 422 and the PN Code Epoch position to the filter and search module 426.

The filter and search module 426 controls the input control module 434 to locate the PN Code Epoch position and to sequence to the proper translator GPS data input samples, for example, at time $t_i$, so that the local carrier generator provides the signal pair $I^*(t_i),Q^*(t_i)$ and the translator GPS data input sample $I(t_i),Q(t_i)$ as inputs. The PN Code Generator 422 provides the PN code in accordance with the navigation message provided by the coordinate aides module 414.

The $I(t_j)Q(t_j)$ input signal, $I^*(t_j)Q^*(t_j)$ local carrier signal, and PN code are processed by the processing stages 410(1)–410(m), in order to downconvert and wipe off the C/A code of the translator GPS sample input. The outputs of the processing stages 410(1)–410(m) are provided to the filter and search module 426, which filters the results, searches for a peak (or peaks) and determines if the results are satisfactory. If the results are not satisfactory, the filter and search module 426 outputs control signals to at least one of the local carrier generator 418, PN code generator 422, stage control module 430 and input control module 434. The filter and search module 426 thus may control incrementing of $t_i$ for sequencing to a next input value, changing the alignment of the PN code or sequencing to a different PN code generated by the PN code generator 422, or changing the number m for increasing or decreasing the number of processing stages 410(s) being used.

For example, if the results are extremely poor, the filter and search module 426 may choose to sequence to a next input data sample set, thus throwing away the current set of samples (P*N samples); change the PN code alignment; and/or increase m. If the results, however, are relatively close to being satisfactory, the filter and search module 426 may choose to continue processing the current input data sample, realign the PN code and/or decrease m for the next sample set. Typically, as processing proceeds, the results of the filter and search 226 improve and m is decreased, reducing processing and thus the processing time.

Figure 6A:
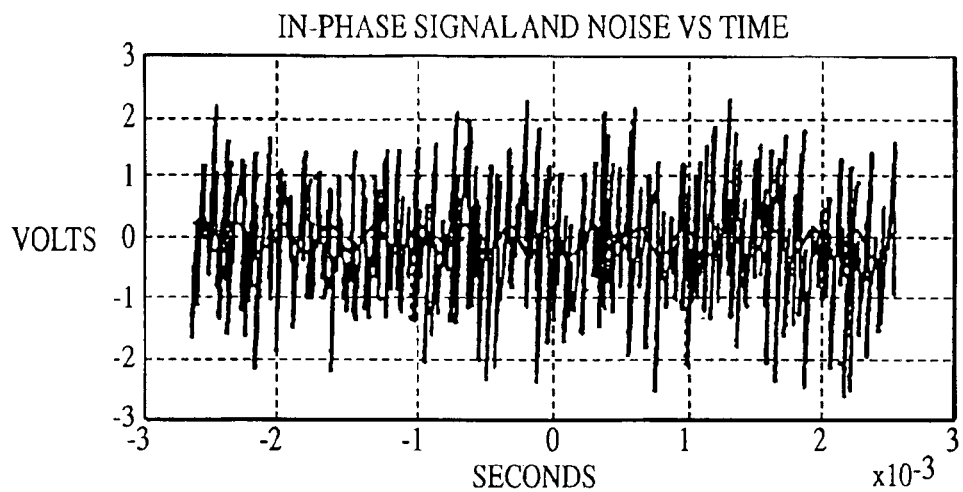
FIG. 6A is a plot of experimental results for an in-phase signal and noise versus time.
Figure 6B:
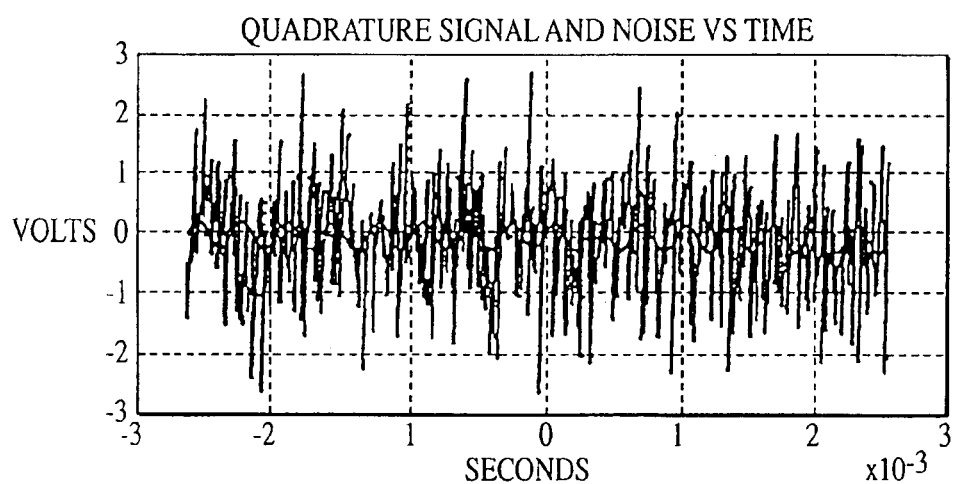
FIG. 6B is a plot of experimental results for a quadrature signal and noise versus time.
Figure 6C:
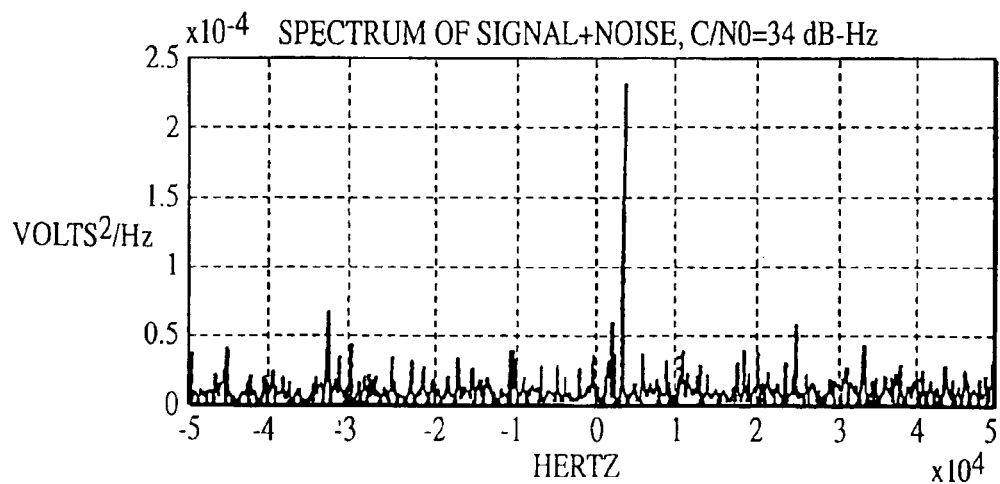
FIG. 6C is a plot of experimental results for a spectrum of signal and noise versus frequency.

FIGS. 6A–C shows experimental results obtained using an exemplary receiving station 22 in accordance with the present invention. The experiment was performed with $\Delta t=10$ $\mu$sec.; N=512; chirp=0; $F_d$=3125.0 HZ; $\Delta f$=195.3125 HZ; and T=5.12 msec/FFT window. FIG. 6A shows a plot of the in-phase signal and noise versus time. FIG. 6B shows a plot of the quadrature signal and noise versus time. FIG. 6C shows a plot of spectrum of signal and noise versus frequency, where C/NO=34 dB-Hz. One can see in FIG. 6C a clearly distinguishable peak, providing information that is not readily apparent in FIGS. 6A and B.

In summary, analysis of GPS data obtained from a fixed receiving station approximately simultaneous with GPS data obtained from a translator mounted within a missile is performed using Fourier Transform processing in a series of processing stages. Continual tracking of the data is performed by making adjustments to phase and rate control of the PN code in the receiving station GPS data while reducing the number of processing stages. High precision processing results are possible while minimizing processing steps and processing time. Additionally, since the processing involves mathematical computations, the entire GPS receiver tracking system can be implemented using only software. Furthermore, the ability to continually track while making adjustments in accordance with the control signals transmitted by the filter and search module 426 is useful for tracking in conditions such as multi-path GPS signals and reflected GPS signals.

What has been described herein is merely illustrative of the application of the principles of the present invention. Other arrangements and methods may be implemented by those skilled in the art without departing from the scope and spirit of the invention.

What is claimed is:

1. A receiving station tracking system for receiving GPS data and tracking a mobile vehicle, the receiving station tracking system comprising:
    a plurality of processing stages receiving and processing at least a portion of the GPS data; and
    a control module receiving and filtering the processed GPS data and outputting at least one control signal in accordance with filtering results, wherein the at least one control signal controls decreasing or increasing a quantity of the plurality of processing stages.

2. The receiving station tracking system of claim 1, wherein the received GPS data includes receiving station GPS data received by the receiving station tracking system and vehicle GPS data received by the vehicle, where the receiving station GPS data and the vehicle GPS data are received approximately simultaneously by the receiving station tracking system and the vehicle, respectively.

3. The receiving station tracking system of claim 1, wherein the receiving station tracking system processes the received GPS data and records the processed GPS data as time ordered receiving station GPS data and vehicle GPS data samples.

4. The receiving station tracking system of claim 3, wherein the at least one control signal controls sequencing to a subsequent vehicle GPS data sample of the GPS data samples.

5. The receiving station tracking system of claim 1, wherein a respective processing stage of the plurality of processing stages includes processing means for performing matched filter processing, fast Fourier Transform processing, and square and sum processing on the vehicle GPS data; and
    wherein an output of the processing means of the respective processing stage is provided to the control module.

6. The receiving station tracking system of claim 1, wherein the receiving station tracking system is implemented in software having a plurality of programmable instructions configured for execution by the plurality of processing stages.

7. The receiving station tracking system of claim 2, wherein a receiver associated with the vehicle is included in a translator mounted on the vehicle, and the translator transmits signals including the vehicle GPS data to the receiving station tracking system.

8. The receiving station tracking system of claim 2, wherein the receiving station tracking system further comprises:
    a PN code generator module providing to the plurality of processing stages a PN code based on a navigation message of the receiving station GPS data; and
    wherein the at least one control signal further controls the PN code generator module for controlling at least the phase and rate of the PN code.

9. The receiving station tracking system of claim 8, wherein each of the processing stages of the plurality of processing stages processes the PN code delayed by a respective delay.

10. The receiving station tracking system of claim 2, further comprising a local carrier generator module for generating and providing to the plurality of processing stages at least one periodic signal; and
    wherein at least one periodic signal associated with the vehicle GPS data is provided to the plurality of processing stages.

11. The receiving station tracking system of claim 10, wherein the at least one control signal controls the local carrier generator module for controlling at least the rate of the at least one periodic signal.

12. The receiving station tracking system of claim 2, wherein the GPS data includes data extracted from the receiving station GPS data.

13. The receiving station tracking system of claim 12, wherein the extracted data includes at least navigation message data and pseudorange data.

14. The receiving station tracking system of claim 12, wherein the receiving station tracking system further includes a coordination module for providing timing and polarity data for coordinating the extracted data with the vehicle GPS data.

15. The receiving station tracking system of claim 14, wherein the receiving station tracking system further includes a peak interpolation module receiving the timing data from the coordination module, wherein the peak interpolation module performs a peak interpolation algorithm on the filtered data, processes the results of the peak interpolation algorithm with the timing data, and outputs tracking data associated with the vehicle GPS data.

16. A receiving station tracking system for receiving GPS data and tracking a vehicle, the receiving station comprising:
    at least one processing stage receiving and processing at least a portion of the GPS data;
    a PN code generator module providing to the at least one processing stage a reference PN code; and
    a control module receiving and filtering the processed GPS data and outputting at least one control signal in accordance with filtering results, wherein the at least one control signal controls the phase and rate of the reference PN code.

17. The receiving station tracking system of claim 16, wherein the received GPS data includes receiving station GPS data received by the receiving station and vehicle GPS data received by the vehicle, wherein the receiving station GPS data and the vehicle GPS data are received approximately simultaneously by the receiving station tracking system and vehicle, respectively; and wherein the reference PN code is derived from the receiving station GPS data.

18. The receiving station tracking system of claim 16, wherein each of the processing stages of the at least one processing stage processes the reference PN code delayed by a different delay.

19. The receiving station tracking system of claim 16, wherein the at least one control signal controls decreasing or increasing a quantity of processing stages of the at least one processing stage.

20. The receiving station tracking system of claim 17, wherein the receiving station tracking system processes the received GPS data and records the processed GPS data as time ordered receiving station GPS data and vehicle GPS data samples.

21. The receiving station tracking system of claim 17, wherein a PN code associated with the receiving station GPS data is based on a navigation message of the receiving station GPS data.

22. A method for tracking a vehicle by a receiving station receiving GPS data comprising the steps of:

processing at least a portion of the received GPS data by a series of processing stages;

filtering the processed GPS data to obtain filtered GPS data;

controlling subsequent processing of the processed GPS data based on the filtered GPS data, wherein controlling includes controlling an amount of processing stages of the series of processing stages to be subsequently used for processing the received GPS data.

23. The method of claim 22, wherein the GPS data includes vehicle GPS data received by the vehicle and provided to the receiving station and receiving station GPS data received by the receiving station, wherein the vehicle and receiving station GPS data are received approximately simultaneously;

wherein the step of continually processing further includes the step of processing the vehicle GPS data in conjunction with a PN code of the receiving station GPS data; and wherein the step of controlling further comprises the step of controlling at least the phase and rate of the PN code.

* * * * *